(12) United States Patent
Okada et al.

(10) Patent No.: US 11,194,108 B2
(45) Date of Patent: Dec. 7, 2021

(54) SLOT-TYPE OPTICAL CABLE

(71) Applicant: SUMITOMO ELECTRIC INDUSTRIES, LTD., Osaka (JP)

(72) Inventors: Keisuke Okada, Osaka (JP); Fumiaki Sato, Osaka (JP); Yoshiaki Nagao, Osaka (JP)

(73) Assignee: SUMITOMO ELECTRIC INDUSTRIES, LTD., Osaka (JP)

( * ) Notice: Subject to any disclaimer, the term of this patent is extended or adjusted under 35 U.S.C. 154(b) by 0 days.

(21) Appl. No.: 16/622,536

(22) PCT Filed: Jun. 13, 2018

(86) PCT No.: PCT/JP2018/022638
§ 371 (c)(1),
(2) Date: Dec. 13, 2019

(87) PCT Pub. No.: WO2018/230618
PCT Pub. Date: Dec. 20, 2018

(65) Prior Publication Data
US 2020/0218021 A1 Jul. 9, 2020

(30) Foreign Application Priority Data
Jun. 14, 2017 (JP) .............................. JP2017-116639

(51) Int. Cl.
*G02B 6/44* (2006.01)
(52) U.S. Cl.
CPC ......... *G02B 6/4408* (2013.01); *G02B 6/4403* (2013.01)

(58) Field of Classification Search
CPC ....... G02B 6/4408; G02B 6/4403; G02B 6/44
See application file for complete search history.

(56) References Cited

U.S. PATENT DOCUMENTS

| 4,820,014 | A | * | 4/1989 | Nishimura | G02B 6/4408 385/103 |
| 4,983,013 | A | * | 1/1991 | Dotzer | G02B 6/4408 174/97 |
| 4,997,257 | A | * | 3/1991 | Spedding | G02B 6/4403 385/110 |
| 5,166,998 | A | * | 11/1992 | Patel | G02B 6/4403 385/114 |
| 5,222,177 | A | | 6/1993 | Chu et al. | |
| 5,561,730 | A | * | 10/1996 | Lochkovic | G02B 6/4403 385/110 |
| 5,630,002 | A | * | 5/1997 | Ota | G02B 6/4408 385/104 |

(Continued)

FOREIGN PATENT DOCUMENTS

| CN | 105229510 A | 1/2016 |
| DE | 25 11 019 A1 | 9/1976 |

(Continued)

*Primary Examiner* — Andrew Jordan
(74) *Attorney, Agent, or Firm* — Faegre Drinker Biddle & Reath LLP

(57) ABSTRACT

A slot type optical cable includes: an optical fiber; a slot rod that includes a plurality of ribs forming a groove in which the optical fiber is accommodatable; and a cable jacket that is provided around the slot rod. The cable jacket includes a sheath portion that is formed around the slot rod at substantially the same thickness by linearly connecting outermost peripheral edges of adjacent ribs.

3 Claims, 3 Drawing Sheets

(56) References Cited

U.S. PATENT DOCUMENTS

| | | | | |
|---|---|---|---|---|
| 5,638,478 | A * | 6/1997 | Iwakura | G02B 6/4408 385/104 |
| 5,661,836 | A * | 8/1997 | Sano | G02B 6/4408 385/111 |
| 5,668,912 | A * | 9/1997 | Keller | H01B 7/385 385/100 |
| 5,715,344 | A * | 2/1998 | Seo | G02B 6/4408 385/110 |
| 5,751,881 | A * | 5/1998 | Konda | G02B 6/4408 385/103 |
| 5,845,032 | A * | 12/1998 | Konda | G02B 6/4408 385/110 |
| 5,848,212 | A * | 12/1998 | Wagman | G02B 6/4408 385/111 |
| 6,052,502 | A * | 4/2000 | Coleman | G02B 6/4407 385/100 |
| 6,122,426 | A * | 9/2000 | Ishikawa | G02B 6/4489 385/105 |
| 6,160,940 | A * | 12/2000 | Summers | G02B 6/4408 385/110 |
| 6,259,843 | B1 * | 7/2001 | Kondo | G02B 6/4403 174/104 |
| 6,424,772 | B1 * | 7/2002 | Blazer | G02B 6/4408 385/109 |
| 6,711,328 | B2 * | 3/2004 | Griffioen | F16L 7/00 385/100 |
| 6,768,845 | B1 * | 7/2004 | Suetsugu | G02B 6/4408 385/102 |
| 7,155,097 | B2 * | 12/2006 | Jakobsen | C03B 37/01205 385/123 |
| 8,548,294 | B2 * | 10/2013 | Toge | G02B 6/441 385/114 |
| 8,660,392 | B2 * | 2/2014 | Wu | G02B 6/4408 385/104 |
| 9,541,722 | B2 * | 1/2017 | Sajima | G02B 6/4495 |
| 9,557,231 | B2 * | 1/2017 | Villiger | G01K 1/14 |
| 9,645,340 | B2 * | 5/2017 | Yamamoto | G02B 6/4408 |
| 9,696,508 | B2 * | 7/2017 | Yamamoto | G02B 6/4409 |
| 10,036,863 | B2 * | 7/2018 | Debban | G02B 6/4403 |
| 10,268,009 | B2 * | 4/2019 | Sato | G02B 6/441 |
| 10,416,403 | B2 * | 9/2019 | Okada | G02B 6/4413 |
| 10,488,609 | B2 * | 11/2019 | Sato | G02B 6/4409 |
| 10,514,517 | B2 * | 12/2019 | Sato | G02B 6/44 |
| 10,845,556 | B2 * | 11/2020 | Sato | G02B 6/4405 |
| 2001/0028773 | A1 * | 10/2001 | Kato | G02B 6/02219 385/109 |
| 2005/0244117 | A1 * | 11/2005 | Tanaka | G02B 6/4403 385/114 |
| 2006/0120676 | A1 * | 6/2006 | Kang | G02B 6/4408 385/105 |
| 2011/0110635 | A1 * | 5/2011 | Toge | G02B 6/441 385/102 |
| 2012/0063732 | A1 * | 3/2012 | Wu | G02B 6/4408 385/104 |
| 2012/0189257 | A1 * | 7/2012 | Kasahara | C03C 25/106 385/114 |
| 2015/0192748 | A1 | 7/2015 | Sato et al. | |
| 2016/0070079 | A1 | 3/2016 | Sajima et al. | |
| 2016/0291278 | A1 * | 10/2016 | Yamamoto | G02B 6/03655 |
| 2017/0023754 | A1 * | 1/2017 | Debban | G02B 6/441 |
| 2017/0031088 | A1 * | 2/2017 | Yamamoto | G02B 6/4409 |
| 2017/0031122 | A1 * | 2/2017 | Yamamoto | G02B 6/02019 |
| 2017/0115451 | A1 * | 4/2017 | Sajima | G02B 6/04 |
| 2018/0314020 | A1 * | 11/2018 | Sato | G02B 6/44 |
| 2018/0321453 | A1 * | 11/2018 | Sato | G02B 6/4489 |
| 2019/0011656 | A1 * | 1/2019 | Sato | G02B 6/44 |
| 2019/0064462 | A1 * | 2/2019 | Okada | G02B 6/44 |
| 2019/0265425 | A1 * | 8/2019 | Stover | G02B 6/4494 |
| 2020/0064550 | A1 * | 2/2020 | Sato | G02B 6/262 |
| 2020/0150368 | A1 * | 5/2020 | Sato | G02B 6/4403 |
| 2020/0183111 | A1 * | 6/2020 | Sato | G02B 6/4403 |
| 2020/0218021 | A1 * | 7/2020 | Okada | G02B 6/4408 |
| 2020/0225432 | A1 * | 7/2020 | Ishikawa | G02B 6/449 |
| 2020/0371306 | A1 * | 11/2020 | Mosier | G02B 6/3889 |

FOREIGN PATENT DOCUMENTS

| | | |
|---|---|---|
| GB | A-1409303 | 10/1975 |
| JP | H02-71808 U | 5/1990 |
| JP | H06-102443 A | 4/1994 |
| JP | 2006-18000 A | 1/2006 |
| JP | 2008-286940 A | 11/2008 |
| JP | A-2010-091842 | 4/2010 |
| JP | 2013-142764 A | 7/2013 |
| JP | 2015-129887 A | 7/2015 |
| JP | 2016-18088 A | 2/2016 |
| WO | WO-2011/043324 A1 | 4/2011 |

* cited by examiner

SLOT-TYPE OPTICAL CABLE

TECHNICAL FIELD

The present invention relates to a slot type optical cable.

BACKGROUND ART

Patent Literature 1 discloses a structure in which a projecting shape is provided on a surface of a cable jacket (also referred to as "sheath").

CITATION LIST

Patent Literature

Patent Literature 1: JP-U-H2-71808

SUMMARY OF INVENTION

According to the present disclosure, there is provided a slot type optical cable including: an optical fiber; a slot rod that includes a plurality of ribs forming a groove in which the optical fiber is accommodatable; and a cable jacket that is provided around the slot rod, in which the cable jacket includes a sheath portion that is formed around the slot rod at substantially the same thickness by linearly connecting outermost peripheral edges of adjacent ribs.

DESCRIPTION OF EMBODIMENTS

Figure 1:
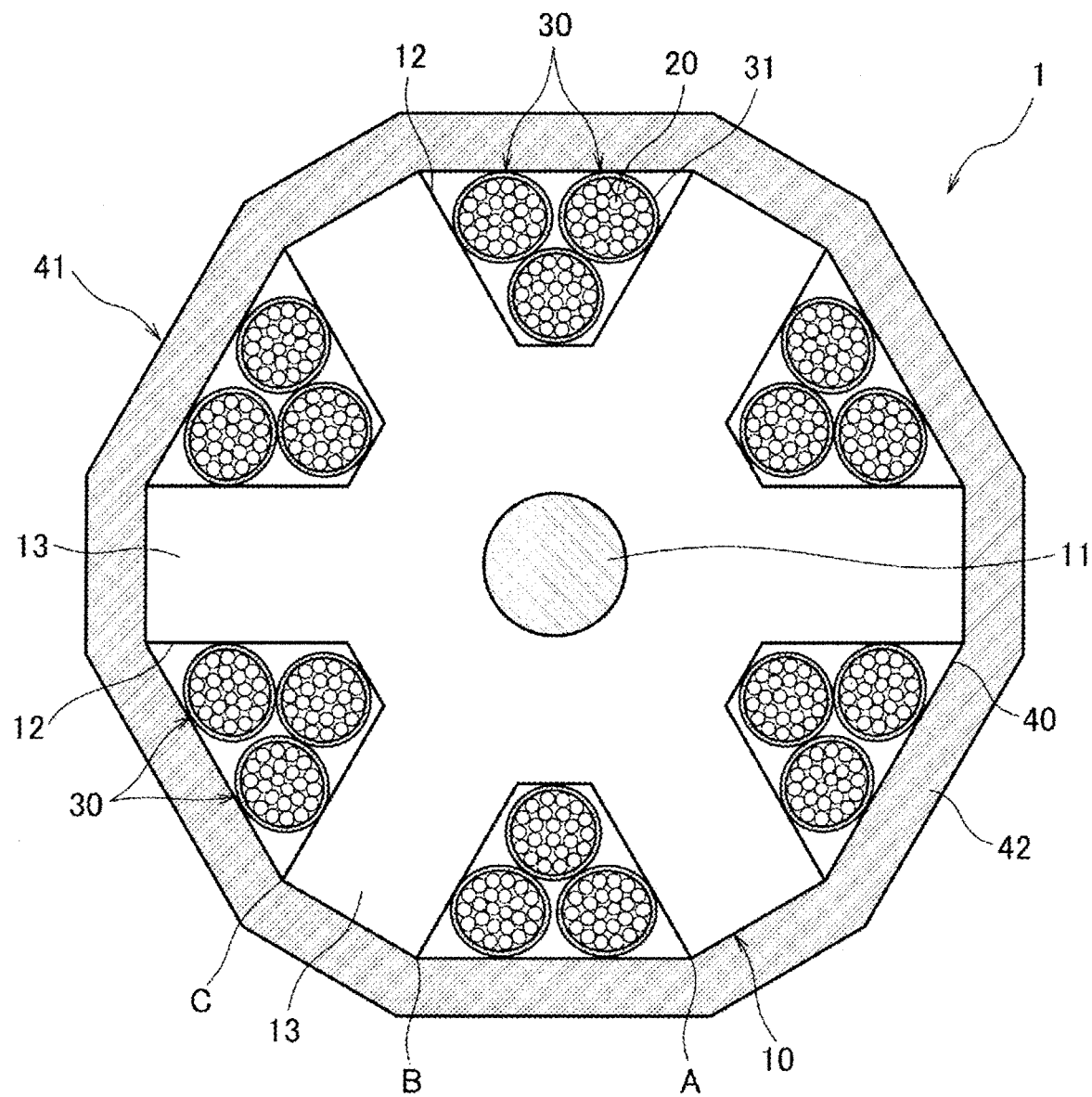
FIG. 1 is a diagram illustrating an example of a slot type optical cable according to a first embodiment of the present invention.

Problems to be Solved by Present Disclosure

In the structure disclosed in Patent Literature 1, there is a problem in that the cable diameter increases by the amount of a projecting shape. Therefore, for a slot type optical cable, a structure capable of reducing friction during installation while avoiding an increase in the diameter of a cable is desired.

Therefore, an object is to provide a slot type optical cable in which high-density packaging can be realized and the amount of friction during installation in a duct is small.

Effects of Present Disclosure

With the present disclosure, an increase in the diameter of a cable can be avoided, high-density packaging of optical fibers can be realized, and the amount of friction during installation in a duct can be reduced.

Description of Embodiment of Present Invention

First, the contents of an embodiment of the present invention will be described.

According to one aspect of the present invention, there is provided (1) a slot type optical cable including:

an optical fiber;

a slot rod that includes a plurality of ribs forming a groove in which the optical fiber is accommodatable; and a cable jacket that is provided around the slot rod, in which the cable jacket includes a sheath portion that is formed around the slot rod at substantially the same thickness by linearly connecting outermost peripheral edges of adjacent ribs. The periphery of the slot rod is covered with the sheath portion having a polygonal outer peripheral shape, and the contact range with a duct inner wall can be reduced compared to a case where a circular cable is routed in a duct. Therefore, it is easy to perform routing in the duct. Unlike the technique in the related art, it is not necessary to provide a projection in a cable jacket, and even when the cable diameter is maintained to be the same as that of the related art, the diameter of the slot rod can be increased. Therefore, high-density packaging of optical fibers can be realized.

(2) The number of the ribs is 6 to 8. When the number of the ribs is less than 6, bending directivity appears, and thus it is difficult to perform bending. In particular, when the number of grooves is an odd number, for example, 5, it is difficult to perform bending. On the other hand, when the number of ribs is more than 8, the shape of a cable is substantially circular such that the contact range with a duct inner wall increases. Therefore, the amount of friction increases, and it is difficult to perform routing in the duct. On the other hand, when a groove is formed using 6 to 8 ribs, a cable having no bending directivity that can be easily installed in a duct can be provided.

(3) A density of a material used for the sheath portion is lower than 0.942 g/cm$^3$. When the sheath portion is formed of a material having a relatively low density, the sheath portion is likely to be extruded to the periphery of the slot rod. Therefore, the productivity of the cable is improved.

(4) A ribbon in which the optical fiber is arranged is accommodated in the groove, and the ribbon is an intermittent ribbon in which a connection portion and a non-connection portion are intermittently formed in a longitudinal direction between some or all of adjacent optical fibers. The intermittent ribbon has flexibility. Therefore, when the intermittent ribbon is used, the occupancy can be increased compared to a general ribbon.

Details of Embodiment of Present Invention

Hereinafter, a preferable embodiment of the slot type optical cable according to the present invention will be described with reference to the accompanying drawings.

Figure 2A:
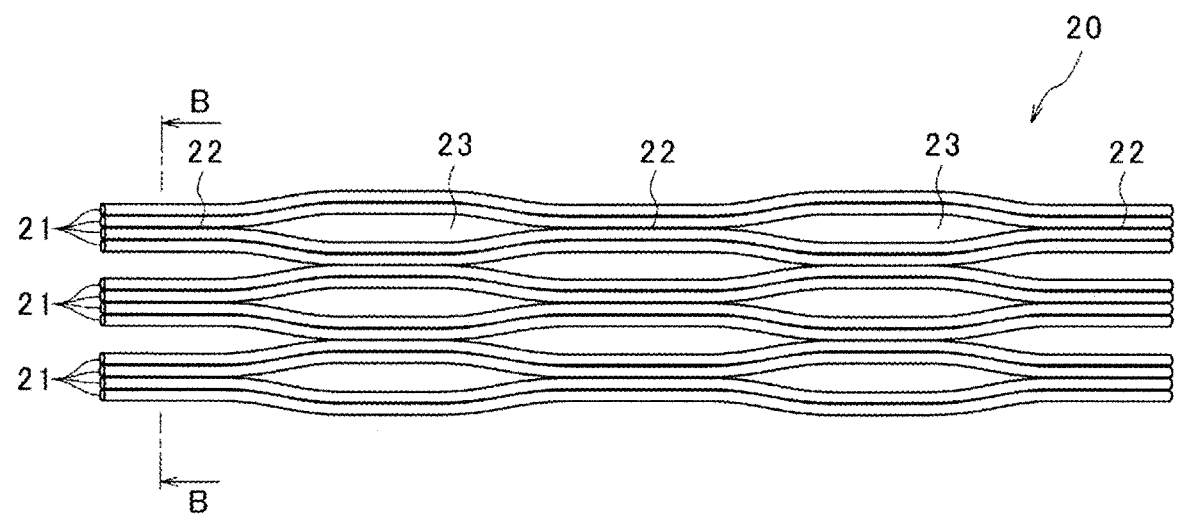
FIG. 2A is a diagram illustrating an example of a structure of an intermittent ribbon in a state where the intermittent ribbon is opened in an arrangement direction.
Figure 2B:
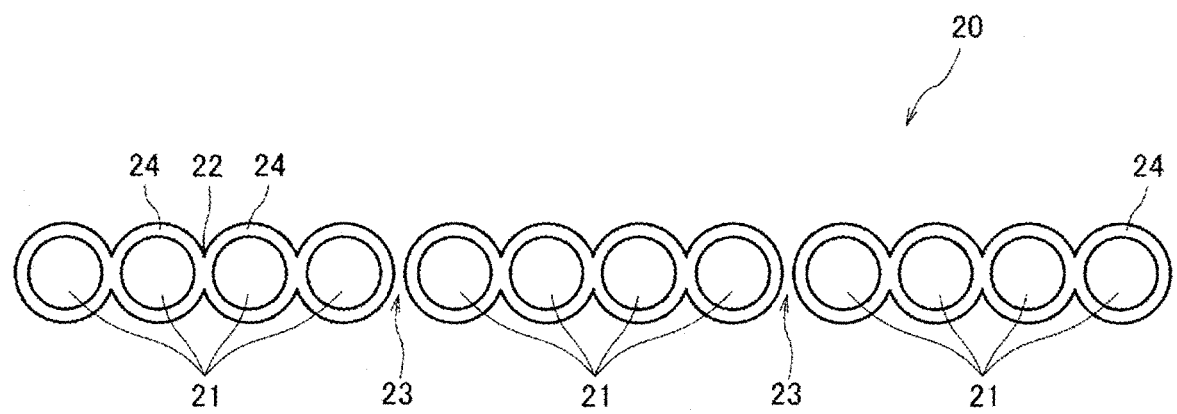
FIG. 2B is a cross-sectional view taken along line B-B of FIG. 2A.

FIG. 1 is a diagram illustrating an example of a slot type optical cable according to a first embodiment of the present invention. FIGS. 2A and 2B are diagrams illustrating an example of a structure of the intermittent ribbon.

For example, the slot type optical cable 1 illustrated in FIG. 1 includes: a slot rod 10; an optical unit 30; a wrapping tape 40 that is vertically attached to or horizontally wound around the periphery of the slot rod 10; and a cable jacket 41 that is provided around the wrapping tape 40.

A tension member 11 is buried in a center portion of the slot rod 10. As the tension member 11, a wire rod having a proof stress against tension and compression, for example, steel wire or FRP (Fiber Reinforced Plastics) can be used.

In addition, a plurality of (for example, six) slot grooves 12 having a spiral shape or a S-Z configuration are formed on an outer peripheral surface of the slot rod 10 along the cable longitudinal direction. The slot groove 12 corresponds to the groove according to the present invention.

Specifically, the slot rod 10 includes, for example, six slot ribs 13 that radially extend from the periphery of the tension member 11, and the slot rib 13 forms the slot groove 12 and partitions the slop groove 12 from the other slope grooves 12. The slot rib 13 corresponds to the rib according to the present invention. A tracer mark that identifies the position of the slot groove 12 can also be provided on an outer peripheral surface of the slot rib 13.

For example, a plurality of 12-fiber intermittent ribbons 20 are accommodated in the slot groove 12.

In the intermittent ribbon, a plurality of optical fibers are arranged in parallel, and some or all of adjacent optical fibers are connected intermittently through a connection portion and a non-connection portion. FIG. 2A illustrates a state where the intermittent ribbon is opened in an arrangement direction, FIG. 2B illustrates a cross-sectional view taken along line B-B of FIG. 2A, and the intermittent ribbon 20 illustrated in the drawing has a configuration in which the 12-fiber ribbon is intermittently connected on a two-fiber basis.

As illustrated in FIG. 2B, a ribbon coating 24 formed of an UV curable resin is provided around each of the optical fibers 21. For example, combinations of two fibers integrated with each other are connected intermittently through a connection portion 22 and a non-connection portion 23. Ribbon coatings 24 are connected in the connection portion 22, and adjacent ribbon coatings 24 are separated without being connected in the non-connection portion 23. In the intermittent ribbon, the connection portion and the non-connection portion are not necessarily on a two-fiber basis. For example, adjacent ribbon coatings 24 may be connected intermittently through the connection portion and the non-connection portion on an one-fiber basis.

The optical fiber 21 accommodated in the intermittent ribbon refers to, for example, an optical fiber in which a glass fiber having a standard outer diameter of 125 μm is covered with a coating having an outer diameter of about 250 μm and the outside thereof is further covered with a color coating. However, the optical fiber 21 is not limited to this configuration and may be a thin fiber having an outer diameter in a range of 135 μm to 220 μm, for example, about 165 μm or 200 μm. When the thin fiber is used, it is easier to perform high-density packaging.

The optical unit 30 illustrated in FIG. 1 is formed, for example, by gathering a plurality of 12-fiber intermittent ribbons 20 and spirally twisting the gathered intermittent ribbons 20. The twisted ribbons 20 may be bound using a bundle material 31 for identification. In addition, the intermittent ribbons 20 may be twisted not only in a spiral shape in one direction but also in a S-Z configuration in which they are periodically inverted.

The intermittent ribbon 20 is more flexible than a general ribbon. When the optical unit 30 is formed of the intermittent ribbons, the occupancy of the optical fibers 21 can be increased. As the ribbons configuring the optical unit 30, connection type ribbons or a bundle of optical fibers may be used instead of using the intermittent ribbons.

The slot rod 10 is wound using the wrapping tape 40 such that the optical unit 30 does not protrude, and outer peripheral shapes thereof are aligned in a polygonal shape (for example, a dodecagonal shape). Specifically, the wrapping tape 40 is wrapped such that the outermost peripheral edges of adjacent slot ribs 13 (edges of the slot ribs 13 that are positioned on the outermost peripheral side in the radial direction) are linearly connected.

As the wrapping tape 40, for example, non-woven fabric that is formed in a tape shape or a combination of a base material such as polyethylene terephthalate (PET) and non-woven fabric can be used. A water-absorbing agent (for example, water-absorbing powder) may be added to the wrapping tape. When the wrapping tape functions as a water-absorbing layer, the intermittent ribbons can be made to be waterproof.

The cable jacket 41 that is formed by extruding a resin such as PE (polyethylene) or PVC (polyvinyl chloride) is provided on the outside of the wrapping tape 40.

The cable jacket 41 includes the sheath portion 42 in which an outer peripheral shape is formed in a polygonal shape (for example, a dodecagonal shape). The cable jacket 41 may be provided by vertically attaching tear strings (not illustrated). In this case, the cable jacket 41 includes not only the sheath portion 42 but also the tear strings.

As an extrusion mold, for example, a dodecagonal mold is used. The slot rod 10 including six ribs wrapped by the wrapping tape 40 is put into the mold, and a predetermined resin is supplied. As a result, as illustrated in FIG. 1, the sheath portion 42 covers the outermost peripheral edges of adjacent slot ribs 13 (edges of the slot ribs 13 that are positioned on the outermost peripheral side in the radial direction) in a state where they are linearly connected. Specifically, the outermost peripheral edges of the slot ribs 13 are indicated by, for example, A, B, and C in FIG. 1. A and B are linearly connected, and B and C are linearly connected. In addition, the sheath portion 42 is formed such that the periphery of the slot rod 10, specifically, the outside of the slot groove 12 or the outside of the slot rib 13 has substantially the same thickness.

This way, the periphery of the slot rod 10 is covered with the sheath portion 42 having a polygonal outer peripheral shape, and the contact range with a duct inner wall can be reduced compared to a case where a circular cable is routed in a duct. Therefore, it is easy to perform routing in the duct. Unlike the technique in the related art, it is not necessary to provide a projection in a cable jacket, and even when the cable diameter is maintained to be the same as that of the related art, the diameter of the slot rod 10 can be increased. Therefore, high-density packaging of optical fibers can be realized.

The density of a material used for the sheath portion 42 is preferably lower than 0.942 g/cm$^3$ (for example, 0.93 g/cm$^3$). A material having a density of 0.942 g/cm$^3$ or higher is also referred to as "high-density polyethylene", and a material having a density of less than 0.942 g/cm$^3$ is referred to as "intermediate-density or low-density polyethylene". This way, when the sheath portion 42 is formed of a material having a relatively low density, the sheath portion is likely to be extruded to the periphery of the slot rod. Therefore, the productivity of the cable is improved.

Figure 3:
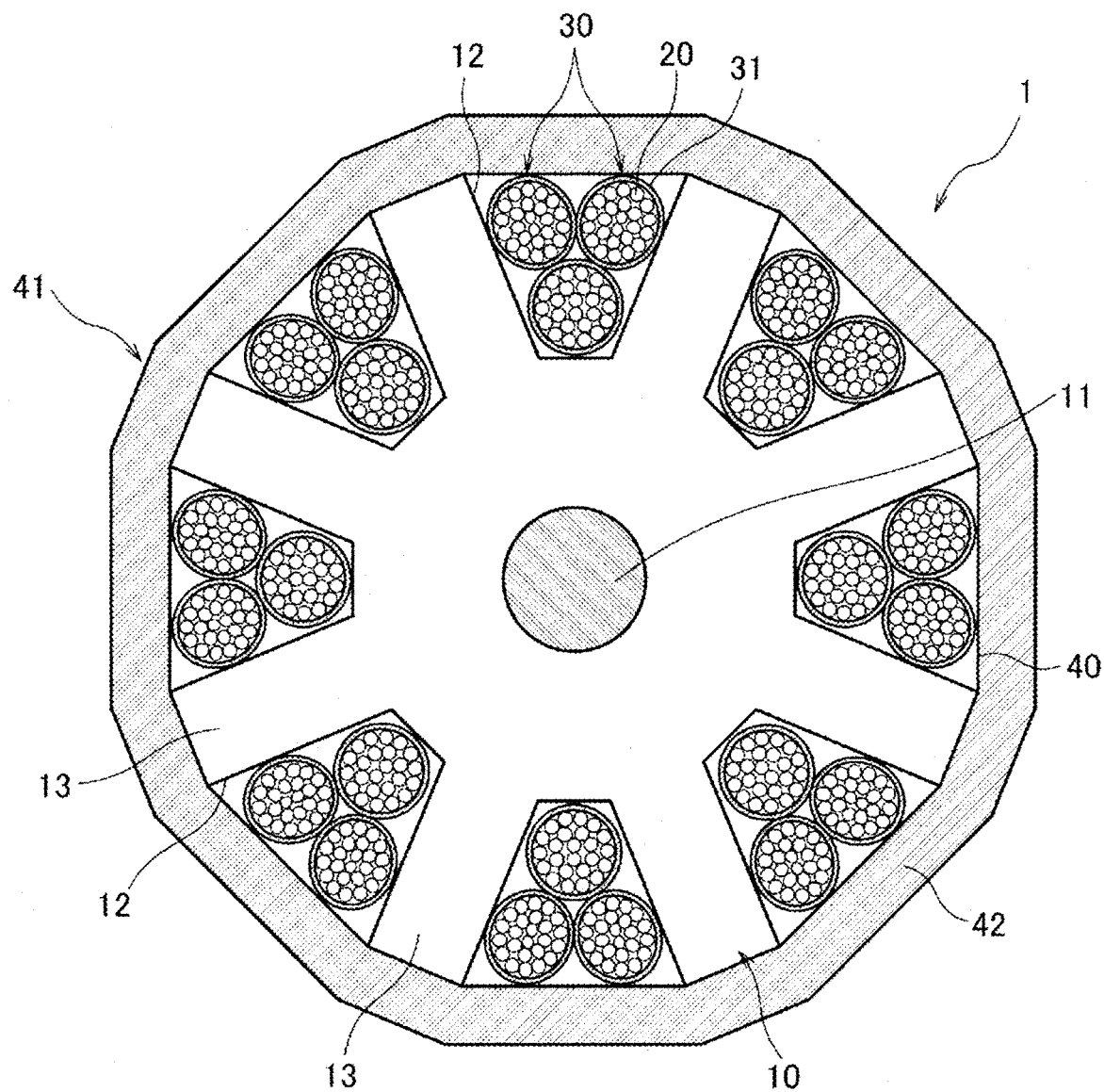
FIG. 3 is a diagram illustrating an example of a slot type optical cable according to a second embodiment of the present invention.

FIG. 3 is a diagram illustrating an example of a slot type optical cable according to a second embodiment of the present invention.

The slot rod according to the first embodiment is formed using six slot ribs 13. However, as illustrated in FIG. 3, the slot rod may be formed using eight slot ribs 13.

The number of slot ribs 13 is preferably 6 to 8. The reason for this is that, when the number of slot ribs is less than 6, bending directivity appears, and it is difficult to perform bending. In particular, when the number of slot grooves is an odd number, for example, 5, it is difficult to perform bending. On the other hand, when the number of slot ribs is more than 8, the shape of a cable is substantially circular such that the contact range with a duct inner wall increases.

Therefore, the amount of friction during installation increases, and it is difficult to perform routing in the duct.

It should be noted that all the features of the embodiments disclosed herein are exemplary and are intended to limit the present invention. It should be noted that the present invention is not limited only to these illustrative examples and is intended for inclusion of all changes within the meaning and scope of equivalency to the scope of claims, as described in the scope of claims.

REFERENCE SIGNS LIST

1: slot type optical cable
10: slot rod
11: tension member
12: slot groove
13: slot rib
20: intermittent ribbon
21: optical fiber
22: connection portion
23: non-connection portion
24: ribbon coating
30: optical unit
31: bundle material
40: wrapping tape
41: cable jacket
42: sheath portion

The invention claimed is:

1. A slot type optical cable comprising:
an optical fiber;
a slot rod that includes a plurality of ribs forming a groove in which the optical fiber is accommodatable; and
a cable jacket that is provided around the slot rod, wherein
the cable jacket includes a sheath portion that is formed around the slot rod at substantially the same thickness,
the sheath portion linearly connects outermost peripheral edges of adjacent ribs,
the sheath portion linearly connects outermost peripheral edges of a same rib, and
the number of the ribs is 6 to 8.

2. The slot type optical cable according to claim 1, wherein
a density of a material used for the sheath portion is lower than 0.942 g/cm$^3$.

3. The slot type optical cable according to claim 1, wherein
a ribbon in which the optical fiber is arranged is accommodated in the groove, and
the ribbon is an intermittent ribbon in which a connection portion and a non-connection portion are intermittently formed in a longitudinal direction between some or all of adjacent optical fibers.

* * * * *